United States Patent [19]
Morlec

[11] 3,770,900
[45] Nov. 6, 1973

[54] AUDIO MULTIFREQUENCY SIGNAL RECEIVER

[75] Inventor: Emile Morlec, Cagnes sur Mer, France

[73] Assignee: International Business Machines Corporation, Armonk, N.Y.

[22] Filed: May 31, 1972

[21] Appl. No.: 258,276

[30] Foreign Application Priority Data

June 1, 1971 France .............................. 7120613

[52] U.S. Cl. .............................................. 179/84 VF
[51] Int. Cl. .......................... H04m 1/50, H04q 9/12
[58] Field of Search ................... 179/84 VF, 16 AA, 179/15 FD, 15 BY, 2.5 R, 2.5 A, 175.2 A

[56] References Cited

UNITED STATES PATENTS

| | | | |
|---|---|---|---|
| 3,710,031 | 1/1973 | Sellari | 179/84 VF |
| 3,319,011 | 5/1967 | Maurushat | 179/16 AA |
| 3,140,357 | 7/1964 | Bischof | 169/16 AA |
| 3,588,374 | 6/1971 | Hensbergen | 169/84 VF |
| 3,649,771 | 3/1972 | Flowers | 169/84 VF |

*Primary Examiner*—Kathleen H. Claffy
*Assistant Examiner*—Alan Faber
*Attorney*—Frederick D. Poag et al.

[57] ABSTRACT

A multifrequency receiver first detects any frequency combination $A_iB_j$ corresponding to the frequency combination code which is used, then invalidates that detection or not according to whether the frequency combination received was mixed with other voice frequencies or not. At the rest state, the input signals are applied to both an A-band-pass filter and a B-band-pass filter, which are respectively followed by two limiters then by two sets of selective filters tuned on the particular code frequencies A1 to A4 and B1 to B3. As soon as a possibly valid frequency combination $A_iB_j$ is detected, a band stop filter rejecting only frequencies of bands A and B is connected to the receiver input and possible noise sources are disconnected from the receiver input. The output signals from the A-band-pass filter and the band stop filter are added and the resulting signals enter the first limiter. Similarly, the output signals from the B-band-pass filter and the band stop filter are added and the resulting signals enter the second limiter. If the previously detected frequency combination was pure, the selective filter will detect it again and the first detection is validated. If not, the energy of signals Ai and Bj at the limiter outputs will not be high enough to activate the selective filters and the detection is not confirmed.

10 Claims, 2 Drawing Figures

AUDIO MULTIFREQUENCY SIGNAL RECEIVER

BACKGROUND OF THE INVENTION

1. Field of the Invention

This invention relates to a receiver for signals constituted by combining audio frequencies, in particular for telephone numbering signals. More particularly, this invention relates to an arrangement allowing the protection of such a receiver against voice signals and other noise signals liable to introduce detection errors.

2. Description of the Prior Art

Coding of numbering signals in the form of a combination of two audio frequencies is more and more frequently used in telephone systems. This arrangement has the advantage of reducing the hazards of simulation by human voice or by music, but does not preclude them completely. Therefore, one of the main problems to be resolved when designing a numbering receiver relates to the protection against these simulated signals.

For this purpose, an arrangement is generally used which not only detects the presence of two simultaneous frequencies constituting a numbering signal but also checks for unwanted signals which can appear on the transmission line. Generally, the input signals are directed towards two separate band selecting channels respectively corresponding to the two frequency bands A and B in which the numbering frequencies are chosen. First of all, each channel includes two parallel filters, each of said filters being followed by a limiter. In the first channel, the first filter allows only the band A frequencies to pass through said first channel and the second filter allows all frequencies to pass through said first channel but the band B frequencies. In the second channel, the arrangement is inverted. Then, each channel comprises separate threshold filters, each of said filters allowing only one of the particular frequencies of the corresponding band to pass through said channels. In operation, first of all, only the first filter of each channel is in circuit. Then, when a frequency combination corresponding to the selected code is detected, the signal source from the inside is disconnected as well as the first filter of each channel. Then, the second filter of each channel is put in circuit. If the previous combination was free of noise, it is detected again. If it was affected by noise, it is no longer detected: in effect, the total output energy being constant due to the limiters, the energy corresponding to the typical frequencies of the code becomes insufficient to actuate the threshold filters.

The major disadvantage of this solution consists in the fact that the phase of the signals going out of the two band selecting filters is not the same and thus, the output signal of the separate filters can be attenuated up to the point of being not detectable.

In addition, in such receivers, the supervision signals such as the dial tone for example, are necessarily considered as unwanted signals and consequently, as signals which can invalidate the multifrequency signals received at the same time.

To avoid this disadvantage, it is known, for example, to use "pre-signalling", i.e., to cause the subscriber's set to emit a short DC pulse to indicate that one desires to be connected to a multifrequency receiver.

It is obvious that this requires the detection of a DC component followed by the immediate connection of the receiver, which cannot be easily carried out.

Also, it has been proposed to use a hybrid transformer at the receiver input. However, in this case, the losses due to the hybrid transformer would be so high that it becomes impossible to balance it for the whole transmission band.

SUMMARY OF THE INVENTION

The primary object of this invention is to provide a solution which does not involve the above-indicated disadvantages of the systems of the prior art and which will be, in addition, less expensive.

Another object of this invention is to enable the detection of the first digit emitted by a telephone set even in the presence of a signal such as the dial tone, emitted by the receiver itself.

Another object of this invention is to allow the supervision signals coming from the outside, for example from the public network, to be heard when there is no numbering, i.e. keyboard "dialing", These various objects and advantages are obtained in accordance with this invention by designing a receiver capable of operating in two separate modes: in the first mode, the receiver operates as a non-protected receiver, i.e., it includes a first detector capable of identifying any signal which could be a valid singal; as soon as such a detection has been performed, the receiver controls the opening of the circuit connecting it to the outside noise source, for example to the public network, and simultaneously connects a voice protecting circuit to the first detector.

In a particular embodiment, the input signals are simultaneously applied to three filters. The first filter allows the passage of only the frequencies of the first band A, the second filter allows the passage of only the band B frequencies and the third filter allows the passage of all frequencies but the ones of bands A and B.

In the first operating modes, only the two first filters are in circuit and therefore, detect any frequency of bands A and B. As soon as two signals in accordance with the code in use are detected, the third filter is put in circuit and its output signals are respectively added to the ones going out of the first and second filters.

If the first detected signals were valid, their detection is confirmed during the second operating mode. This second detection is easy due to the fact that the signal was not subjected to any unwanted modification. In the opposite case, the detection is not confirmed.

The foregoing and other objects, features and advantages of the invention will be apparent from the following more particular description of a preferred embodiment of the invention, as illustrated in the accompanying drawings.

BRIEF DESCRIPTION OF THE DRAWINGS

Now, referring to FIGS. 1 and 2, a particular embodiment of the audio multifrequency signal receiger of this invention will be described. The arrangements of the following embodiment are within but do not limit the scope of the invention.

The invention both as to its organization and method of operation, together with further objects and advantages thereof, will best be understood with reference to the following specification taken in connection with the accompanying drawings.

DESCRIPTION OF A PRFFERRED EMBODIOMENT

Figure 1:
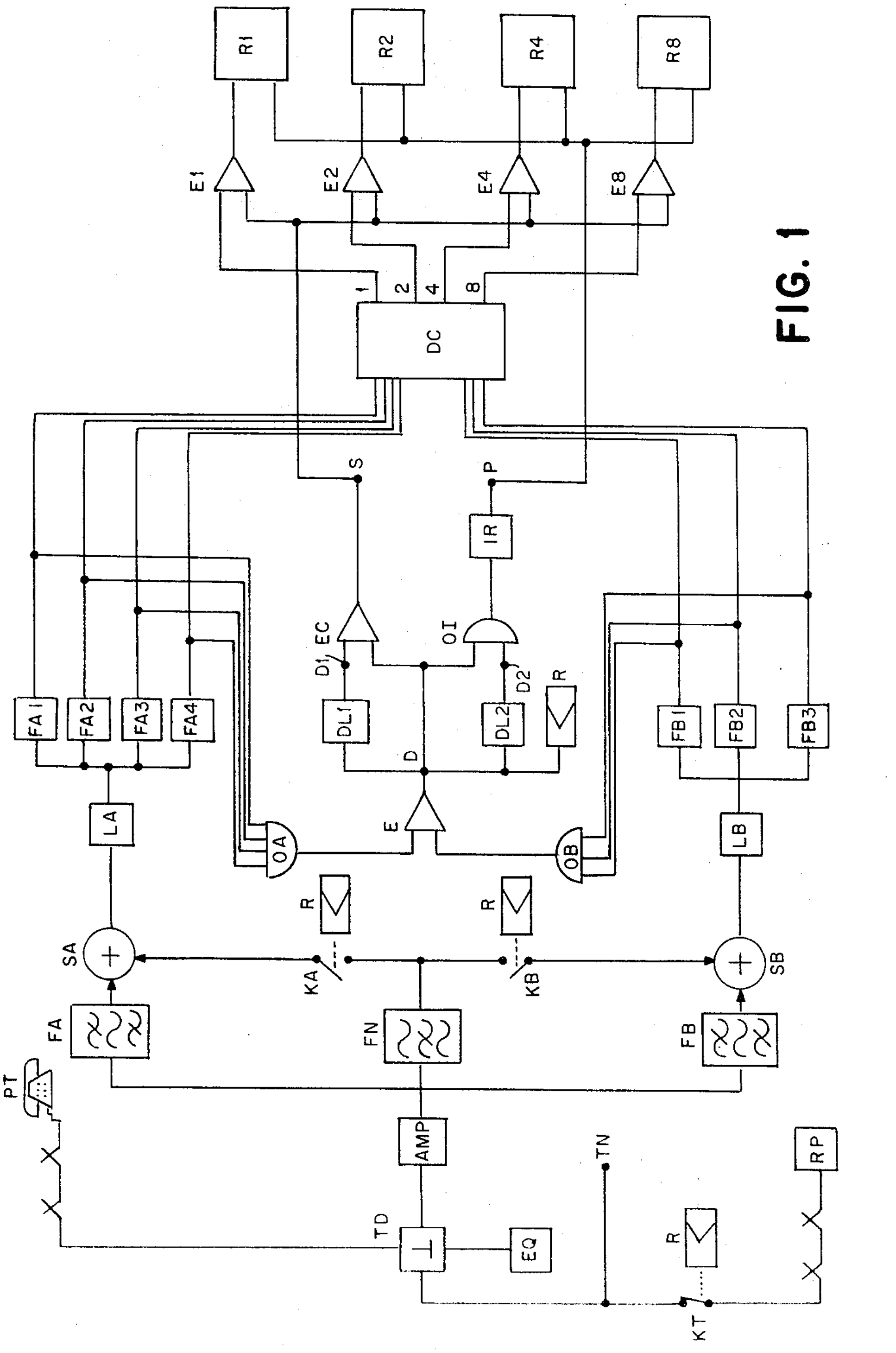
FIG. 1 schematically shows an audio multifrequency signal receiver of this invention.

Keyboard set PT of the private telephone exchange is connected to the two-wire side of a hybrid transformer TD. One of the branches of the four-wire circuit of hybrid transformer TD is connected through a switch KT which is normally closed to the switching network of the private telephone exchange, then to an output line of this exchange towards public telephone exchange RP. This same branch is also connected to dial tone source TN which is associated to the audio frequency receiver. The second branch of the four-wire circuit of transformer TD is connected to an amplifier AMP. Transformer TD comprises a balancing circuit EQ.

The output of amplifier AMP is connected to the inputs of three filters FA, FB, FN. Filter FA is a band-pass filter which allows the passage of only all the frequencies of the first band A to which numbering frequencies A1, A2, A3 and A4 belong.

Filter FB is also a band-pass filter which allows the passage of only the frequencies of band B to which numbering frequencies B1, B2 and B3 belong.

It is known that it is conventional to code the numbering digits by a combination of two signals, one being taken from frequency band A and the second one being taken from frequency band B.

Filter FN is a band-pass filter which allows the passage of all frequencies but the frequencies of bands A and B. The output of said filter FN is connected, on the one hand, to a first summing circuit SA through a switch KA which is normally open and, on the other hand, to a second summing circuit SB through a switch KB which is normally open. The abovementioned switches KA, KB and KT are actuated by the same relay R the operation of which will be explained later when dealing with other circuits.

The output of filter FA is also connected to summing circuit SA, and the output of filter FB is connected to another input of summing circuit SB.

The output of summing circuit SA is connected to an amplitude limiter LA, the output of which is connected to the inputs of the four filters FA1, FA2, FA3, FA4. These four filters respectively allow the passage of the four frequencies A1, A2, A3 and A4 respectively, and deliver an output signal only if these frequencies are present with a predetermined minimum amplitude. The outputs of these filters are connected to a same OR circuit OA, the output of which is connected to the input of an AND circuit E.

In the same way, the output of summing circuit SB is connected to an amplitude limiter LB, the output of which is connected to the inputs of three filters FB1, FB2 and FB3. These filters allow the passage of frequencies B1, B2 and B3 only, and deliver a signal only when these signals have a predetermined minimum amplitude. The outputs of these filters are connected to the inputs of an OR circuit OB the output of which is connected to a second input of AND circuit E.

Output D of AND circuit E is connected to the input of a delay circuit DL1 which introduces a delay of 25 milliseconds. Output D1 of this delay circuit is connected to the first input of an AND circuit EC. Output D of circuit E is also connected to the input of a second delay circuit DL2 the delay of which is of 30 milliseconds, and output D2 of which is connected to the first input of an OR circuit OI.

Output D of AND circuit E is also directly connected to the second input of AND circuit EC and to the second input of OR circuit OI.

At last, output D of AND circuit E is also connected to abovementioned relay R which, in the presence of a signal on this output, actuates above-indicated switches KA, KB and KT.

The outputs of filters FA1, FA2, FA3 and FA4 are connected to a decoder DC, as well as the outputs of filters FB1, FB2, FB3. The purpose of this decoder is to detect the particular frequency combinations and to transform them into a code, for example a binary code usable by the central control unit. In this example, it has been assumed, to simplify the explanation, that decoder DC feeds four registers R1, R2, R4 and R8 the contents of which respectively show the various binary weights. As shown on the figure, the first input of these registers which are, in fact, latches, is connected to the output of AND circuits E1, E2, E4 and E8 one input of which is connected to an output of decoder DC, and the second input of which is connected to output S of abovementioned AND circuit EC. The second input of registers R1, R2, R4 and R8, i.e., the input switching these registers from state 1 to state 0, is connected to output P of an inverter IR the input of which is connected by abovementioned OR circuit OI.

Referring to FIG. 1, the operation of the circuit shown on this figure will be subsequently described.

As long as no frequency combination including at least one frequency of band A and one frequency of band B appears at the input of the receiver of this invention, the system is not operating since on the one hand, filters FA and FB do not supply any output signal and on the other hand, switches KA and KB are open, these switches being normally open in rest position.

When a signal comprising at least a combination of band A and band B frequencies appears at the input of the receiver, both filters FA and FB respectively allow the passage of the corresponding signals. These signals pass through summing circuits SA, SB and their amplitude is limited in limiters LA, LB. The signal of band A is detected by one of filters FA1 to FA4, and the signal of band B is detected by one of filters FB1 to FB3. Therefore, both OR circuits OA and OB conduct and consequently, output D of AND circuit E is fed. The signal appearing on this output causes relay R to be energized, which causes on the one hand, opening of switch KT which, at rest, was in the closed condition, and, on the other hand, closing of switches KA and KB which, at rest, were open. At the same time, delay circuits DL1 and DL2 start operating but their respective outputs are not energized before the end of the corresponding delays.

The opening of switch KT causes the input of the audio frequency receiver to be disconnected from any interference source of public network RP, for example, supervision tones supplied by this network.

The presence of a signal in output D of circuit E also allows the disconnection of dial tone source TN located inside the multifrequency receiver, and which is used to supply the dial tone to the keyboard telephone set such as PT when this one is calling.

First of all, let us assume that the signals appearing at the input of the audio frequency receiver are effectively valid numbering signals, i.e., they are constituted of two frequencies, for example A1 and B2, and that these frequencies are not mixed with unwanted signals.

When switches KA and KB are closed, the output of summing circuits SA and SB is not modified since filter FN which normally allows the passage of all frequencies but the frequencies of band A and B, does not deliver any signal at this time. Therefore, frequency A1 is going to be detected by filter FA1 and frequency B2 is going to be detected by filter FB2. These two detections will cause OR circuits OA and OB to be energized and therefore, AND circuit E to be energized. Since it has been assumed that the received frequency combination was free of unwanted noise signals, this combination will have a duration for valid signals. Consequently, AND circuit EC will conduct after a time equal to 25 milliseconds. If it is assumed that the combination of frequencies A1 and B2 represents the digit "3", for example, output 1 and 2 of decoder DC will be fed, and these outputs will cause a bit 1 to be recorded into registers R1 and R2 since corresponding AND circuits will be energized by the feeding of the output line of AND circuit EC. The presence of a bit 1 in registers R1 and R2 indicates the presence of digit "3" emitted by keyboard set PT. These registers are scanned as known in the art, by a central unit which stores this digit into its memory.

Figure 2:
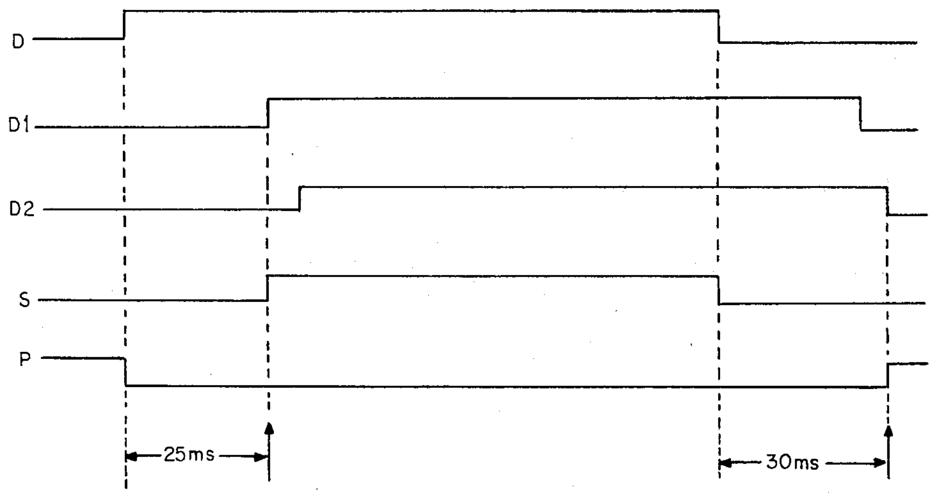
FIG. 2 is a diagram showing the logic levels at points D, D1, D2, S and P versus the time of FIG. 1, when receiving valid signals.

Delay circuit DL2 and the logic circuits including OR circuit OI and inverter IR are used to prevent misidentification by the receiver of interruptions of the multifrequency signal as intervals between digits, where the interruptions are too short to be validly significant, and misinterpretation of voice-simulated signals as valid digits. The diagrams of FIG. 2 give the respective output levels at the various points D, D1, D2, S, and P of the logic circuit assembly. In particular, it appears in this figures that output P of inverter IR becomes high only if the absence of a signal following the detection of such a signal has a duration of 30 milliseconds at least, i.e. the duration corresponding to the normal time interval which should separate two successively emitted digits. The output circuit of this inverter IR enables the various registers R1, R2, R4 and R8 to be reset to zero, to be ready to receive the next digit.

If it is now assumed that the input signal of the receiver comprises a frequency combination, A1 and B2 for example, said frequencies being respectively in bands A and B, but that it also comprises audio frequencies outside these bands, the system operates as follows.

First of all, both filters FA and FB will detect the two frequencies of the received combination, belonging to bands A and B; these two frequencies will be transmitted through summing circuits SA and SB and limiters LA, LB respectively, to filter sets FA1 to FA4 and FB1 to FB3. These two frequencies will be detected, for example, by filter FA1 and filter FB2 if frequencies A1 and B2 are concerned and output point D of AND circuit E will be at a high level. This will energize relay R and consequently, as explained above, will open switch KT putting the signals coming from the public network off-circuit, and will close switches KA and KB, then putting filter FN in parallel with filters FA and FB. Summing circuit SA will add the signals of frequency A1 and the signals transmitted by filter FN which, as already stated, have frequencies belonging neither to band A, nor to band B. In the same way, summing circuit SB will add the signals of frequency B2 transmitted by filters FB and the signals transmitted by filter FN. Limiters LA and LB will bring the output signals of summing circuits SA and SB back to a predetermined level. The output signals of limiter LA will comprise a component at frequency A1 and components at frequencies not belong to bands A and B. The energies corresponding to each of these frequencies will be proportionally distributed with respect to the input energies of the limiter and for this reason, filter FA1 which, as known, detects only signals of an amplitude exceeding a determined threshold, will not detect frequency A1. It will be the same for filter FB2 which, for the same reasons, will not be able to detect the presence of frequency B2. Therefore, OR dircuits OA and OB will not longer conduct and output D of AND circuit E will not be fed. These operations being performed in less than 25 milliseconds, output S of AND circuit EC will not be fed, since point D will drop to a low level before the end of this delay. In addition, relay R will be deenergized and switches KA and KB will open while switch KT will close. Then, the receiver will be ready to receive other signals and to detect their validity as required.

While there has been described what are, at present, considered to be the preferred embodiment of the invention, it will be understood that various modifications may be made therein, and it is intended to cover in the appended claims all such modifications as fall within the true spirit and scope of the invention. It is obvious that said invention can be applied whatever the frequency code in use and the number of frequencies characterizing each information may be.

What is claimed is:

1. An audio multifrequency signal receiver for detecting and recording information emitted by a subscriber's telephone set coded in the form of a combination of at least two frequencies, respectively belonging to two frequency bands A and B of the type including:

a first channel receiving the input signals, provided with a first band pass filter allowing only the frequencies of band A to pass through, a first amplitude limiting means, a first set of threshold selective filters in parallel and connected to the output of said first limiting means and each one allowing only one particular frequency of the frequency code belonging to band A to pass through, and first detection means for detecting the presence of a signal on one output, at least, of the filters of said first filter set, a second channel receiving the input signals, provided with a second band pass filter allowing only the frequencies of band B to pass through, a second amplitude limiting means, a second set of threshold selective filters in parallel and connected to the output of said second limiting means and each one allowing only one particular frequency of the frequency code belonging to band B to pass through, and second detection means for detecting the presence of a signal on one output, at least, of the filters of said second filter set, characterized in said receiver includes:

a reject filter receiving the input signals and allowing all frequencies to pass through, except the ones belonging to bands A and B, the output of said reject filter including a first branch provided with a first switch opened at rest and a second branch provided with a second switch also opened at rest, a first summing circuit adding the signals delivered by said first band-pass filter and by said reject filter when said first switch is closed and the output of which is connected to the input of said first limiting means, a second summing circuit adding the signals delivered by said second band-pass filter and by said reject filter when said second switch is closed, and the output of which is connected to the input of said second limiting means.

2. A receiver in accordance with claim 1, further including a third detection means responsive to the combined action of said first and second detection means, said third detection means, when actuated, closing said first and second switches.

3. A receiver according to claim 2, further including signal checking means responsive to said third detection means, said checking means comprising a first circuit checking that the duration of the received frequency-coded information signal is at least equal to a first predetermined duration and a second circuit checking that the time interval between the reception of two successive information signals is at least equal to a second predetermined duration.

4. A receiver according to claim 3 for further including signal decoding and recording means, and wherein the signal delivered by said first checking circuit controls the recording of the received information after decoding.

5. A receiver according to claim 4 characterized in that the signal delivered by said second checking circuit prevents the received information from being effectively recorded.

6. An audio multifrequency signal receiver for detecting and recording information emitted by a subscriber's telephone set coded in the form of a combination of at least two frequencies, respectively belonging to two frequency bands A and B of the type including:

an input which can be connected, on the one hand, to the subscriber's set and, on the other hand, to a source of supervising signals through a tone switch, a first channel receiving the input signals provided a first band pass filter allowing only the frequencies of band A to pass through, a first amplitude limiting means, a first set of threshold selective filters in parallel and connected to the output of said first limiting means and each one allowing only one particular frequency of the frequency code belonging to band A to pass through, and first detection means for detecting the presence of a signal on one output, at least, of the filters of said first filter set, a second channel receiving the input signals, provided with a second band pass filter allowing only the frequencies of band B to pass through, a second amplitude limiting means, a second set of threshold selective filters in parallel and connected to the output of said second limiting means and each one allowing only one particular frequency of the frequency code belonging to band B to pass through, and second detection means for detecting the presence of a signal on one output, at least, of the filters of said second filter set, third detection means responsive to the combined action of said first and second detection means and controlling, when actuated, on the one hand, disconnection from said supervising signal source and, on the other hand, actuation of circuits checking the duration of detected signals and decoding, then the recording of the information considered as valid, characterized in that said receiver includes, a reject filter receiving the input signals and allowing all frequencies to pass through, except the ones belonging to bands A and B, the output of said reject filter including a first branch provided with a first switch open at rest and a second branch provided with a second switch also open at rest, a first summing circuit adding the signals delivered by said first band-pass filter and by said reject filter when said first switch is closed and the output of which is connected to the input of said first limiting means, a second summing circuit adding the signals delivered by said second band-pass filter and by said reject filter when said second switch is closed, and the output of which is connected to the input of said second limiting means, and in that said third detection means also controls, when actuated, the closing of said first and second switches.

7. A receiver according to claim 6 characterized in that:

the subscriber's set may be connected through its telephone exchange switching network, to the two-wire input of a hybrid transformer, said supervision signal source is connected through said tone switch to two of the four-wire output wires of said hybrid transformer, and the other two wires of the four-wire output of said hybrid transformer are connected to an amplifier the output of which is connected to the input of said receiver.

8. A receiver according to claim 6 characterized in that said checking circuits include a first checking circuit comprising a first delay circuit introducing a delay of a first predetermined duration and an AND circuit, the output of said third detecting means being connected on the one hand to the input of said delay circuit and to a first input of said AND circuit, and the output of said first delay circuit being connected to the second input of said AND circuit.

9. A receiver according to claim 8 characterized in that said checking circuits include a second checking circuit comprising a second delay circuit introducing a delay of said second predetermined duration, an OR circuit and a logic inverter, the output of said third detection means being connected on the one hand to the input of said second delay circuit and on the other hand to a first input of said OR circuit, the output of said delay circuit being connected to the second input of said OR circuit, and the output of said OR circuit being connected to the input of said logic inverter.

10. A receiver according to claim 9 characterized in that each of said first and second detection means is constituted by an OR circuit and in that said third detection means is an AND circuit.

* * * * *